(12) United States Patent
Wang et al.

(10) Patent No.: US 7,659,956 B2
(45) Date of Patent: Feb. 9, 2010

(54) PIXEL UNIT AND DISPLAY DEVICE UTILIZING THE SAME

(75) Inventors: Yeong-Feng Wang, Taoyuan County (TW); Chun-Hao Tung, Taoyuan County (TW); Liang-Bin Yu, Taoyuan County (TW)

(73) Assignee: AU Optronics Corp., Hsinchu (TW)

( * ) Notice: Subject to any disclaimer, the term of this patent is extended or adjusted under 35 U.S.C. 154(b) by 368 days.

(21) Appl. No.: 11/563,718

(22) Filed: Nov. 28, 2006

(65) Prior Publication Data

US 2007/0153194 A1    Jul. 5, 2007

(30) Foreign Application Priority Data

Dec. 30, 2005    (TW) .............................. 94147630 A (51) Int. Cl.
   *G02F 1/1343* (2006.01)
(52) U.S. Cl. ............................. 349/139; 349/42; 349/43
(58) Field of Classification Search ........................ None
   See application file for complete search history.

(56) References Cited

U.S. PATENT DOCUMENTS 5,285,302 A * 2/1994 Wu .............................. 349/43

6,509,939 B1 * 1/2003 Lee et al. ...................... 349/39
6,999,053 B2    2/2006 Lee et al.
2003/0086044 A1 * 5/2003 Inoue et al. .................. 349/141

FOREIGN PATENT DOCUMENTS

JP          08076083        3/1996
TW           567463         2/2006

OTHER PUBLICATIONS

TW Office Action mailed Apr. 11, 2007.

* cited by examiner

*Primary Examiner*—Dung Nguyen
*Assistant Examiner*—Lucy P Chien
(74) *Attorney, Agent, or Firm*—Thomas, Kayden, Horstemeyer & Risley (57) ABSTRACT

A pixel unit comprising a first metal layer and a second metal layer. The first metal layer comprises a gate electrode and a first electrode. The second metal layer comprises a drain electrode, a source electrode, and a second electrode. The drain electrode overlaps the gate electrode in a first overlapping region. The source electrode overlaps the gate electrode in a second overlapping region. The second electrode overlaps the first electrode in a third overlapping region. The size of the first electrode approximates that of the second electrode. The first electrode and the second electrode are staggered.

24 Claims, 6 Drawing Sheets

PIXEL UNIT AND DISPLAY DEVICE UTILIZING THE SAME

BACKGROUND OF THE INVENTION

1. Field of the Invention

The present invention relates to a pixel unit, and more particular, to a pixel unit capable of auto-compensating parasitic capacitances.

2. Description of the Related Art

Figure 1A:
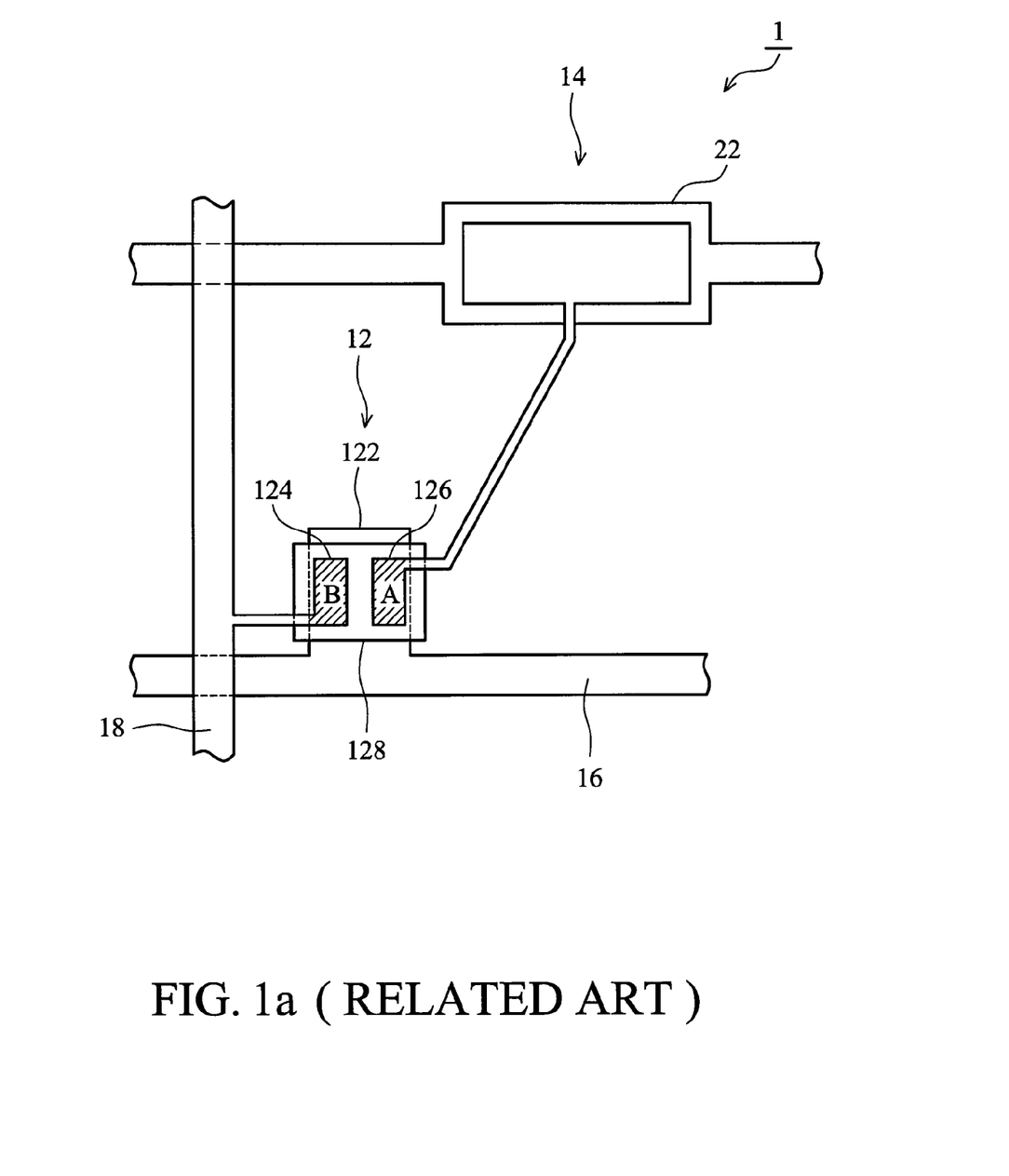
FIG. 1a is a schematic diagram of a conventional pixel unit.

FIG. 1a is a schematic diagram of a conventional pixel unit. The pixel unit 1 comprises a thin film transistor (TFT) 12 and a storage capacitor 14. The TFT 12 comprises a gate electrode 122 coupled to a gate line 16, a source electrode 124 coupled to a source line, and a drain electrode 126.

The gate electrode 122 is formed by a first metal layer and the source electrode 124 and the drain electrode 126 is formed by a second metal layer. When an region 128, formed by a semiconductor layer, is disposed between the first and the second metal layers, a parasitical capacitor $C_P$ is formed by the gate electrode 122, an overlapping region A, and the drain electrode 126, wherein the drain electrode 126 overlaps the gate electrode 122 in the overlapping region A. Another parasitical capacitor is additionally formed near the gate electrode 122, an overlapping region B, and the source electrode 124, wherein the source electrode 124 overlaps the gate electrode 122 in the overlapping region B.

Figure 1B:
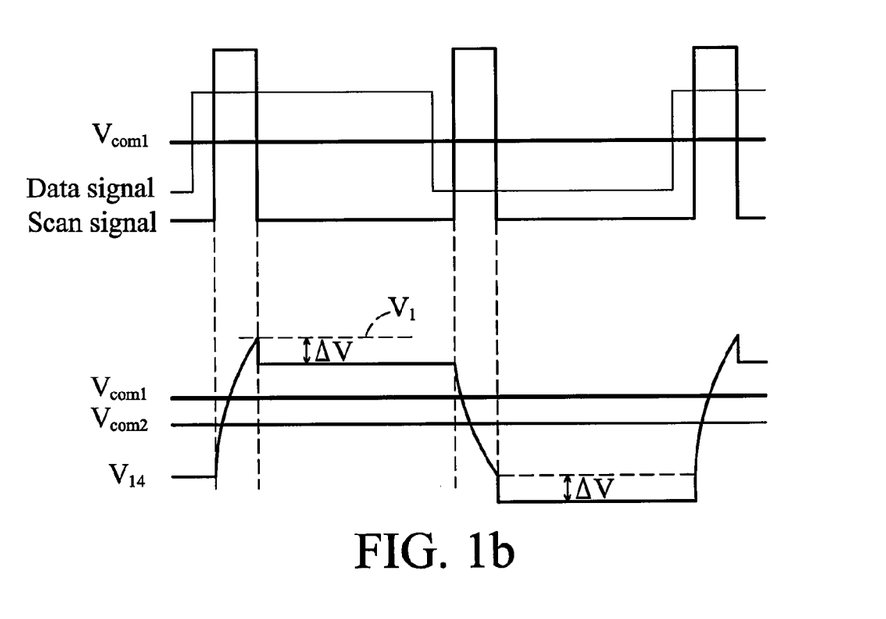
Figure 1C:
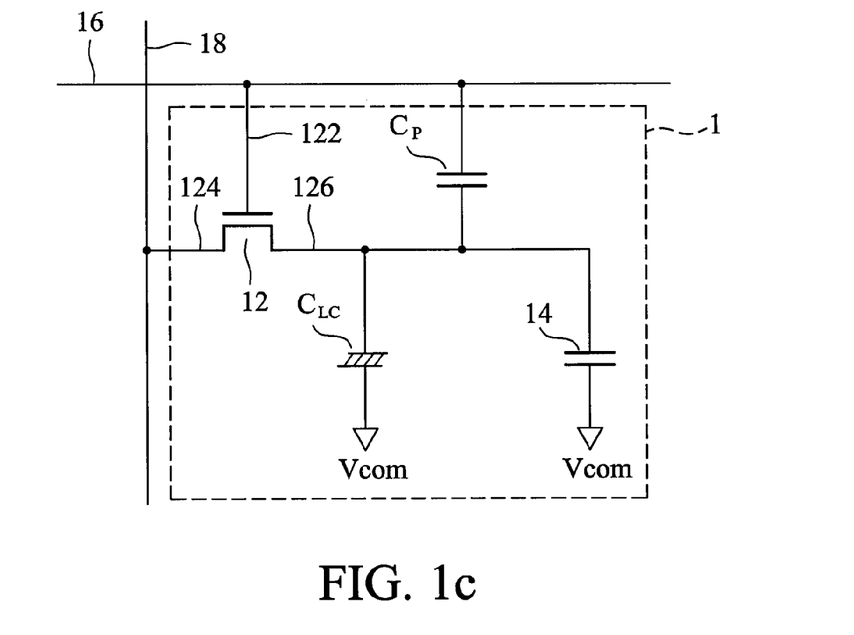

FIG. 1b is an equivalent circuit for the conventional pixel unit shown in FIG. 1a. FIG. 1c is a timing diagram for the conventional pixel unit shown in FIG. 1a. During period $t_1$, a logic level of a scan signal, which is received by the gate line 16, is changed from low to high, the TFT 12 is turned on, the storage capacitor 14 and a liquid crystal capacitor $C_{LC}$ begins charging according to a data signal of the source line 18, and the voltage of the liquid crystal capacitor $C_{LC}$ is charged to reach a voltage $V_1$.

After period $t_1$, the logic level of the scan signal is changed from high to low such that the TFT 12 is turned off and a voltage $V_{14}$ stored in the storage capacitor 14 is equal to the voltage $V_1$. Since the parasitical capacitor $C_P$ is generated between the gate electrode 122 and the drain electrode 126, the voltage $V_{14}$ stored in the storage capacitor 14 is reduced $\Delta V$ from the voltage $V_1$.

Since the voltage $V_{14}$ and the voltage stored in the liquid crystal capacitor $C_{LC}$ represent a brightness of the pixel unit 1, when the voltage $V_{14}$ is changed, the pixel unit 1 will display abnormal brightness. A conventional method of solving this problem controls the common voltage $V_{com}$ of a first electrode 22. When the voltage $V_{14}$ stored in storage capacitor 14 reduces $\Delta V$, the common voltage $V_{com1}$ is reduced $\Delta V$ to a new common voltage $V_{com2}$.

When manufacturing large size display panels, because the area of a mask region is insufficient to cover the display panel, the display panel is divided into various regions. Lithography technology comprising an exposure step, a developing step, an etching step, is then executed in each region.

When an alignment error occurs in any step, the area of the overlapping region A is changed such that a capacitance of the parasitical capacitor $C_P$ is also changed. Since pixel units in different regions are formed during different periods, capacitances of the parasitical capacitors $C_P$ in different pixel units are different.

When capacitances of parasitical capacitors $C_P$ in a display are different, the conventional solution cannot compensate effect for the effect upon parasitical capacitors.

BRIEF SUMMARY OF THE INVENTION

Pixel units are provided. An embodiment of a pixel unit comprises a first metal layer and a second metal layer. The first metal layer comprises a gate electrode and a first electrode. The second metal layer comprises a drain electrode overlapping the gate electrode in a first overlapping region, a source electrode overlapping the gate electrode in a second overlapping region, and a second electrode overlapping the first electrode in a third overlapping region. The size of the first electrode approximates that of the second electrode and the first electrode and the second electrode are staggered.

Display devices are also provided. An embodiment of a display device comprises a scan driver, a data driver, and a plurality of pixel units. The scan driver provides at least one scan signal. The data driver provides at least one data signal. Each pixel unit receives the scan and data signals and comprises a first metal layer and a second metal layer. The first metal layer comprises a gate electrode and a first electrode. The second metal layer comprises a drain electrode overlapping the gate electrode in a first overlapping region, a source electrode overlapping the gate electrode in a second overlapping region, and a second electrode overlapping the first electrode in a third overlapping region. The size of the first electrode approximates that of the second electrode and the first electrode and the second electrode are staggered.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1b is an equivalent circuit for the conventional pixel unit shown in FIG. 1a;

FIG. 1c is a timing diagram for the conventional pixel unit shown in FIG. 1a;

FIGS. 2b-5b are schematic diagrams of another embodiment of pixel unit.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

When a TFT 12 is turned from on to off, a voltage stored in a storage capacitor 14 is shifted due to a parasitical capacitor $C_P$. The shift value $\Delta V$ is expressed by the following equation 1.

$$\Delta V = (V_{gateoff} - V_{gateon}) \frac{C_{gd}}{C_{gd} + C_s + C_{other}} \quad \text{(equation 1)}$$

wherein $C_{gd}$ is a capacitance of the parasitic capacitor $C_P$, $C_S$ is a capacitance of the storage capacitor 14, $C_{other}$ is a capacitance of other capacitors, such as a liquid crystal capacitor $C_{LC}$, $V_{gateoff}$ is a gate voltage when the TFT 12 is turned off, and $V_{gateon}$ is a gate voltage when the TFT 12 is turned on.

When an alignment error does not occur, if the TFT 12 is turned form on to off, the shift value $\Delta V_1$ of the storage capacitor 14 is expressed by the following equation 2.

$$\Delta V_1 = (V_{gateoff} - V_{gateon}) \frac{C_{gd1}}{C_{gd1} + C_{s1} + C_{other}} \quad \text{(equation 2)}$$

wherein $C_{gd1}$ is a capacitance of the parasitical capacitor $C_P$ when the alignment error does not occur, and $C_{S1}$ is a capacitance of the storage capacitor 14 when the alignment error does not occur.

When an alignment error occurs, if the TFT 12 is turned from on to off, the shift value $\Delta V_2$ of the storage capacitor 14 is expressed by the following equation 3.

$$\Delta V_2 = (V_{gateoff} - V_{gateon}) \frac{C_{gd2}}{C_{gd2} + C_{s2} + C_{other}} \quad \text{(equation 3)}$$

wherein $C_{gd2}$ is a capacitance of the parasitical capacitor $C_P$ when the alignment error occurs, and $C_{S2}$ is a capacitance of the storage capacitor 14 when the alignment error occurs.

To maintain the shift value, the shift value $\Delta V_1$ is set to equal the shift value $\Delta V_2$. The result is given in following equation 4.

$$(V_{gateoff} - V_{gateon}) \frac{C_{gd1}}{C_{gd1} + C_{s1} + C_{other}} = \quad \text{(equation 4)}$$

$$(V_{gateoff} - V_{gateon}) \frac{C_{gd2}}{C_{gd2} + C_{s2} + C_{other}}$$

Equation 4 is simplified to generate equation 5.

$$\frac{C_{gd1}}{C_{gd2}} = \frac{C_{S1} + C_{other}}{C2 + C_{other}} \quad \text{(equation 5)}$$

According to equation 5, when the capacitance $C_{gd}$ of the parasitical capacitor $C_P$ is shifted from the capacitance $C_{gd1}$ to the capacitance $C_{gd2}$, if the capacitance of the storage capacitor 14 is adjusted from the capacitance $C_{S1}$ to the capacitance $C_{S2}$, the alignment error cannot effect the shift value $\Delta V$ of the capacitor 14.

For example, when the alignment error does not occur, the capacitance $C_{gd1}$ of the parasitical capacitor $C_P$ is 0.05 pF, the capacitance $C_{S1}$ of the storage capacitor 14 is 0.7 pF, and the capacitance $C_{other}$ is 0.8 Pf. When the alignment error is occurring, the capacitance $C_{gd2}$ of parasitic capacitor $C_P$ is changed to $0.05+\Delta C_{gd}$ pF, the capacitance $C_{S1}$ of the storage capacitor 14 is changed to $0.7+\Delta C_S$ pF, and the capacitance $C_{other}$ is 0.8 Pf. Therefore, equation 5 is simplified as follows.

$$\frac{0.05}{0.05 + \Delta C_{gd}} = \frac{0.7 + 0.8}{0.7 + \Delta C_S + 0.8} \quad \text{(equation 6)}$$

$$\Delta C_S = \frac{1.5}{0.05} \cdot \Delta C_{gd} = 30 \cdot \Delta C_{gd} \quad \text{(equation 7)}$$

To compensate for the alignment error, if the shift capacitance $\Delta C_{gd}$ of the parasitic capacitor $C_P$ is equal to 0.01 pF, the shift capacitance $\Delta C_S$ of the storage capacitor 14 is equal to 0.3 Pf. A positive correlation, such as a direct ratio correlation, is between the capacitance $C_{gd}$ and $C_S$.

Figure 2A:
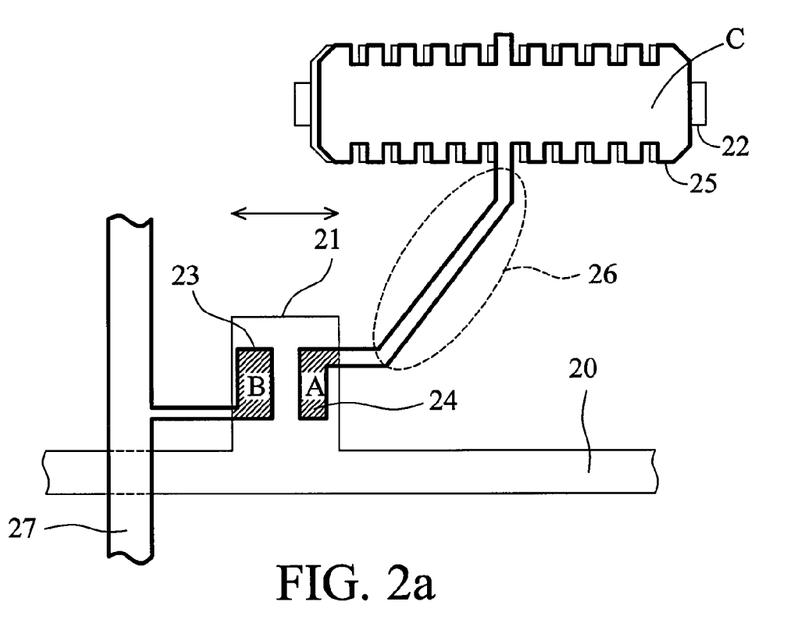
FIG. 2a is a schematic diagram of an embodiment of pixel unit.

FIG. 2a is a schematic diagram of an exemplary embodiment of a pixel unit. The pixel unit can be applied in display devices for receiving scan signals provided by a scan driver (not shown) and data signals provided by a data driver (not shown).

The pixel unit comprises a first metal layer and a second metal layer for constituting a driving device within the pixel unit. The first metal layer comprises a gate electrode 21 and a first electrode 22. A gate line 20 is coupled to the gate electrode 21 for providing scan signals.

The second metal layer comprises a source electrode 23, a drain electrode 24, and a second electrode 25. A source line 27 is coupled to the source electrode 23 for providing data signals.

Drain electrode 24 overlaps the gate electrode 21 in an overlapping region A, the source electrode 23 overlaps the gate electrode 21 in an overlapping region B, and the second electrode 25 overlaps the first electrode 22 in an overlapping region C. The size of the first electrode 22 approximates that of the second electrode 25 and the first electrode 22 and the second electrode 25 are staggered. The second metal layer further comprises a connection electrode 26 for connecting the drain electrode 24 and the second electrode 25. Connection electrode 26 does not overlap the first metal layer.

Since a semiconductor layer is disposed between the first and the second metal layers, the parasitic capacitor $C_P$ shown in FIG. 1b is formed by the gate electrode 21, the overlapping region A, and the drain electrode 24, the storage capacitor 14 shown in FIG. 1b is formed by the first electrode 22, the overlapping region C, and the second electrode 25, and the TFT 12 shown in FIG. 1b is formed by the gate electrode 21, the source electrode 23, and the drain electrode 24.

A parasitic capacitor is formed by the gate electrode 21, the overlapping region B, and the source electrode 23, when the TFT 12 is turned off, the parasitic capacitor formed by the gate electrode 21, the overlapping region B, and the source electrode 23 does not effect upon the voltage stored in the storage capacitor 14. Thus, the parasitic capacitor is omitted When the shape of the first electrode 22 and the second electrode 25 are changed, overlapping region C is changed accordingly to correspond to the overlapping region A. The sharps of the first electrode 22 and the second electrode 25 are not limited. In this embodiment, the first electrode 22 and the second electrode 25 are have a fish bones shape.

As shown in FIG. 2a, when the drain electrode 24 and the second electrode 25 shifts from a left direction to a right direction, the areas of the overlapping regions A and C are reduced. Thus, the capacitances of the parasitical capacitor $C_P$ and the storage capacitor 14 are reduced. When the drain electrode 24 and the second electrode 25 shifts from the right direction to the left direction, the areas of the overlapping regions A and C are increased. Thus, the capacitances of the parasitic capacitor $C_P$ and the storage capacitor 14 are increased. When the area of the overlapping region A does not change, the area of the overlapping region C does not be change.

Figure 2B:
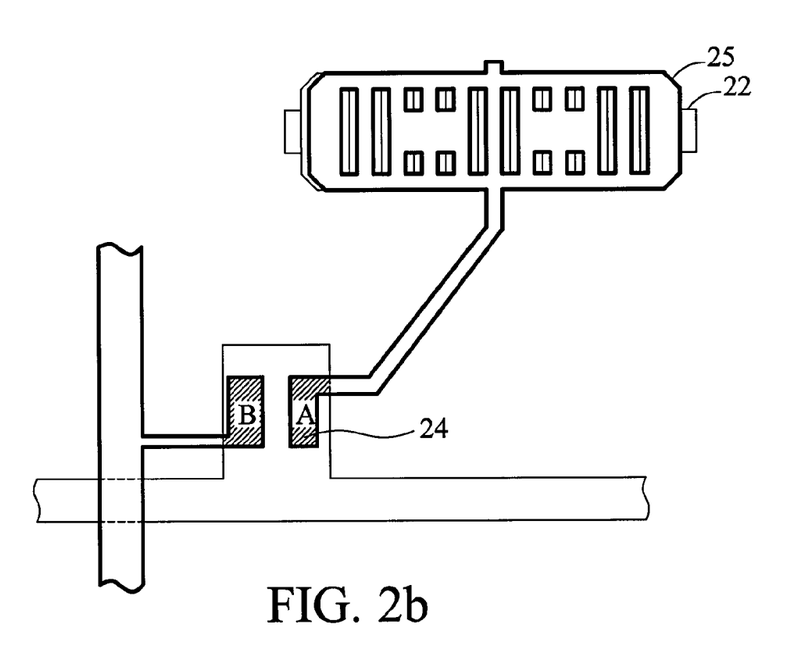

FIG. 2b is a schematic diagram of another embodiment of a pixel unit. FIG. 2b is similar to FIG. 2a except the first electrode 22 and the second electrode 25 are rail shaped. When the drain electrode 24 moves horizontally in a left-right direction, the second electrode 25 also moves horizontally in the left-right direction. As shown in FIG. 2b, the drain electrode 24 and the gate line 20 are vertical such that holes of the first electrode 22 and the second electrode 25 and the gate line 20 are vertical.

Figure 3A:
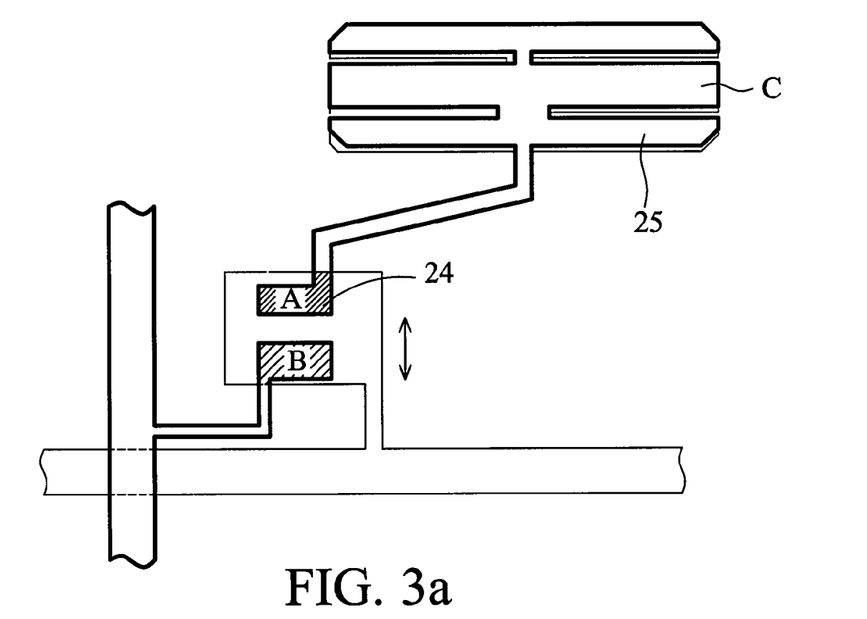

FIG. 3*a* is a schematic diagram of another embodiment of a pixel unit. The pixel unit shown in FIG. 3*a* compensates the alignment error in a vertical direction. When the drain electrode 24 moves vertically in a top-down direction, the second electrode 25 also moves vertically in the top-down direction. Therefore the area of overlapping region C is changed correspond to the area of the overlapping region A. As shown in FIG. 3*a*, drain electrode 24 and gate line 20 are horizontal such that holes of the first electrode 22 and the second electrode 25 and the gate line 20 are horizontal.

Figure 3B:
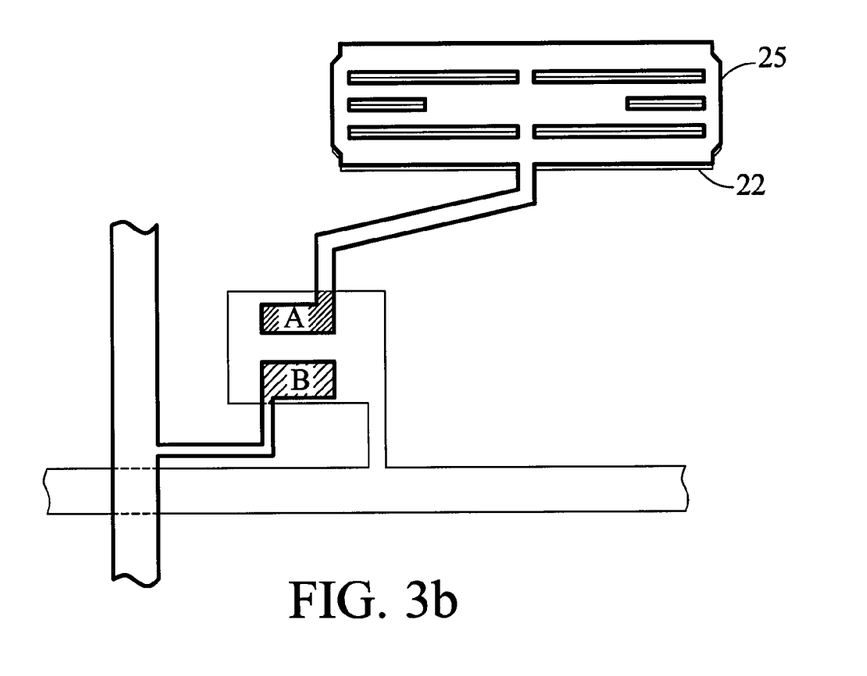

FIG. 3*b* is a schematic diagram of another embodiment of a pixel unit. FIG. 3*b* is similar to FIG. 3*a* except the sharps of the first electrode 22 and the second electrode 25.

The embodiments shown in FIGS. 2*a*-3*b* prevent the alignment error from occurring in the second metal layer. The embodiments shown in FIGS. 4*a*-5*b* prevent the alignment error from occurring in the semiconductor layer disposed between the first and the second metal layers.

Figure 4A:
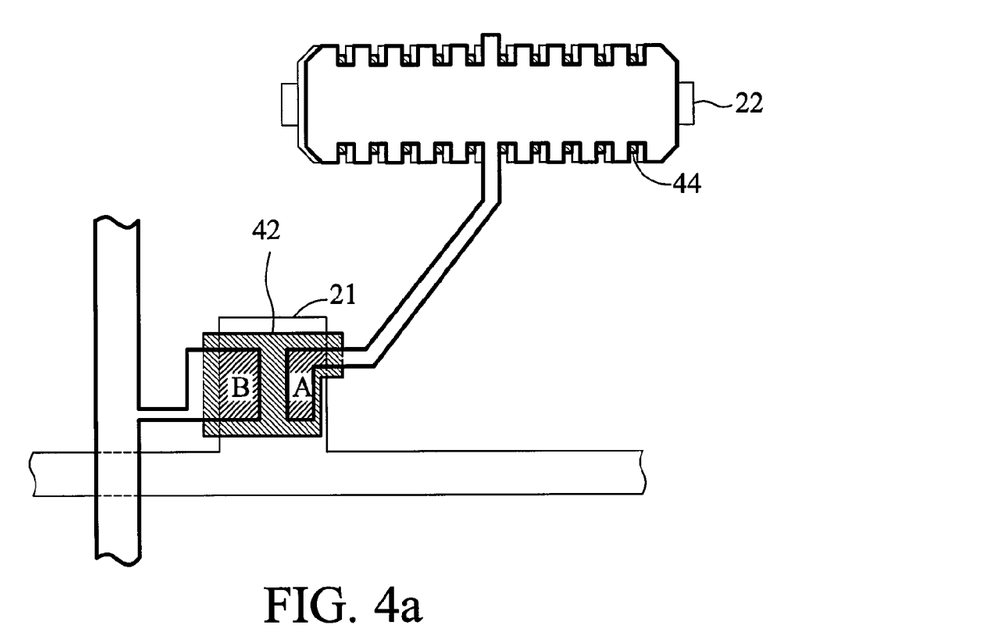
Figure 4B:
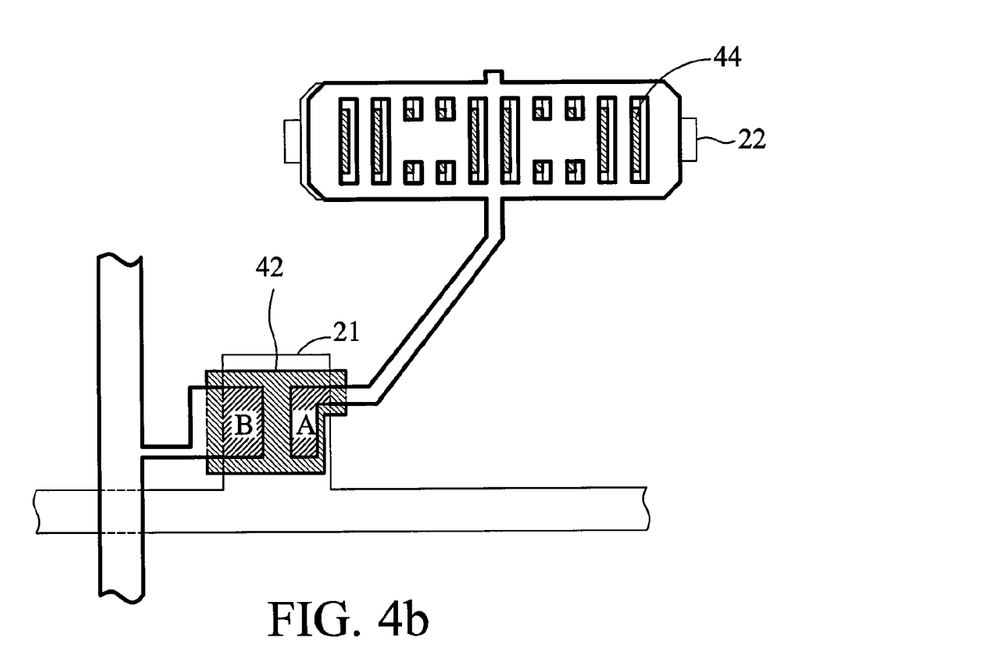

As shown in FIGS. 4*a* and 4*b*, the semiconductor layer comprises regions 42 and 44. The region 42 overlaps the gate electrode 21 in a first overlapping region. The region 44 overlaps the first electrode 22 in a second overlapping region. When the region 42 shifts from a right direction to a left direction, the area of the first overlapping region are reduced. When region 42 shifts from the left direction to the right direction, the area of the first overlapping region are increased.

Figure 5A:
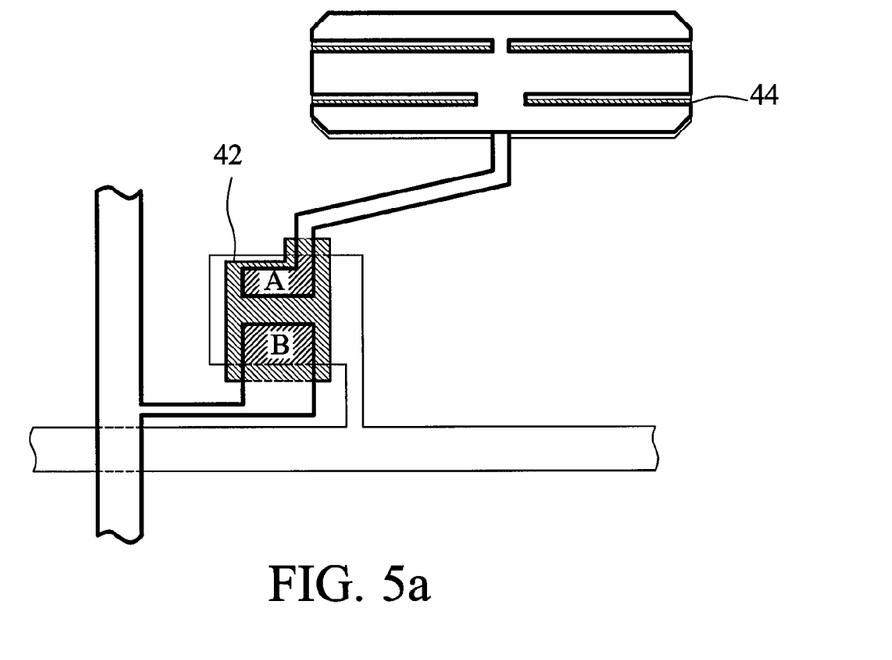
Figure 5B:
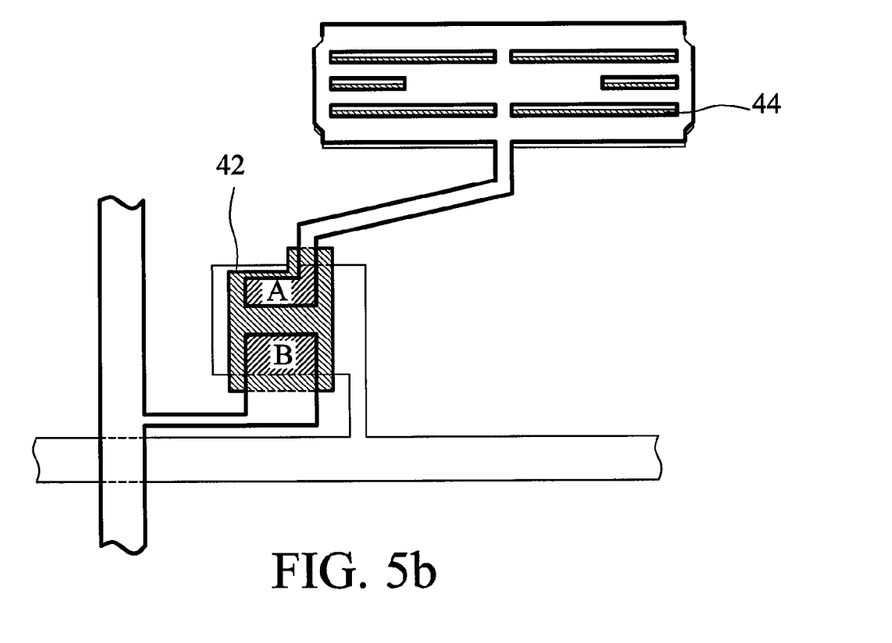

To prevent the effect of capacitance from parasitic capacitor $C_P$ on the first overlapping region, the area of the second overlapping region is changed to correspond to the area of the first overlapping region. As shown in FIGS. 5*a* and 5*b*, when the semiconductor layer moves horizontally in a left-right direction, the measures of the first and the second overlapping regions are changed.

Since the capacitance of the storage capacitor is changed according to the capacitance of the parasitical capacitor, the capacitance of the parasitic capacitor can be auto-compensated when an alignment error occurs. Therefore, the shift value of storage capacitor is fixed such that the conventional solution can be applied to compensate the shift value of storage capacitor.

While the invention has been described by way of example and in terms of the preferred embodiments, it is to be understood that the invention is not limited to the disclosed embodiments. Rather, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pixel unit, comprising:
   a first metal layer comprising a gate electrode and a first electrode; and
   a second metal layer comprising a drain electrode overlapping the gate electrode in a first overlapping region, a source electrode overlapping the gate electrode in a second overlapping region, and a second electrode overlapping the first electrode in a third overlapping region, wherein the size of the first electrode approximates that of the second electrode and wherein the first electrode and the second electrode are staggered, wherein the areas of the first, the second, and the third overlapping regions are changed when the second metal layer is horizontally or vertically moved.

2. The pixel unit of claim 1, wherein the variable quantity of the area of the first overlapping region and that of the area of the third overlapping region have a direct ratio correlation.

3. The pixel unit of claim 1, wherein the area of the third overlapping region is changed according to the area of the first overlapping region when the shapes of the first and the second electrode are changed.

4. The pixel unit of claim 3, wherein the shapes of the first and the second electrode are fish-bone-shaped or railing-shaped.

5. The pixel unit of claim 1, further comprising a connection electrode coupled between the second electrode and the drain electrode, wherein the connection electrode does not overlap the gate electrode or the first electrode when the area of first overlapping region is changed.

6. The pixel unit of claim 5, wherein the second metal layer comprises the connection electrode.

7. The pixel unit of claim 1, further comprising a semiconductor layer disposed between the first and the second metal layers, wherein the semiconductor layer overlaps the gate electrode in a fourth overlapping region and wherein the semiconductor layer overlaps the first electrode in a fifth overlapping region.

8. The pixel unit of claim 7, wherein the areas of the fourth and fifth overlapping regions are changed when the semiconductor layer is horizontally or vertically moved.

9. The pixel unit of claim 7, wherein the fourth overlapping region overlaps a portion of the first overlapping region and a portion of the second overlapping region and wherein the fifth overlapping region overlaps a portion of the third overlapping region.

10. The pixel unit of claim 1, further comprising a gate line, the gate electrode being coupled to the gate line, wherein the first electrode comprises a first hole, and the second electrode comprises a second hole, and wherein the first hole and the gate line are vertical and the second hole and the gate line are vertical when the drain electrode and the gate line are vertical.

11. The pixel unit of claim 1, further comprising a gate line, the gate electrode being coupled to the gate line, wherein the first electrode comprises a first hole, and the second electrode comprises a second hole, and wherein the first hole and the gate line are horizontal and the second hole and the gate line are horizontal when the drain electrode and the gate line are horizontal.

12. The pixel unit of claim 1, wherein the shapes of the first and the second electrodes are substantially the same.

13. A display device, comprising:
   a scan driver for providing at least one scan signal;
   a data driver for providing at least one data signal; and
   a plurality of pixel units for receiving the scan and data signals, each pixel unit comprising a first metal layer comprising a gate electrode and a first electrode, and a second metal layer comprising a drain electrode overlapping the gate electrode in a first overlapping region, a source electrode overlapping the gate electrode in a second overlapping region, and a second electrode overlapping the first electrode in a third overlapping region, wherein the size of the first electrode approximates that of the second electrode and wherein the first electrode and the second electrode are staggered, wherein the areas of the first, the second, and the third overlapping regions are changed when the second metal layer is horizontally or vertically moved.

14. The display device of claim 13, wherein the variable quantity of the area of the first overlapping region and that of the area of the third overlapping region have a direct ratio correlation.

15. The display device of claim 13, wherein the area of the third overlapping region is changed according to the area of the first overlapping region when the shapes of the first and the second electrode are changed.

16. The display device of claim 15, wherein the shapes of the first and the second electrode are fish-bone-shaped or railing-shaped.

17. The display device of claim 13, further comprising a connection electrode coupled between the second electrode and the drain electrode, wherein the connection electrode does not overlap the gate electrode or the first electrode when the area of first overlapping region is changed.

18. The display device of claim 17, wherein the second metal layer comprises the connection electrode.

19. The display device of claim 13, further comprising a semiconductor layer disposed between the first and the second metal layers, wherein the semiconductor layer overlaps the gate electrode in a fourth overlapping region and wherein the semiconductor layer overlaps the first electrode in a fifth overlapping region.

20. The display device of claim 19, wherein the areas of the fourth and fifth overlapping regions are changed when the semiconductor layer is horizontally or vertically moved.

21. The display device of claim 20, wherein the fourth overlapping region overlaps part of the first overlapping region and part of the second overlapping region, and wherein the fifth overlapping region overlaps part of the third overlapping region.

22. The display device of claim 13, wherein each pixel unit further comprises a gate line, the gate electrode being coupled to the gate line, wherein the first electrode comprises a first hole, and the second electrode comprises a second hole, and wherein the first hole and the gate line are vertical and the second hole and the gate line are vertical when the drain electrode and the gate line are vertical.

23. The display device of claim 13, wherein each pixel unit further comprises a gate line, the gate electrode being coupled to the gate line, wherein the first electrode comprises a first hole, and the second electrode comprises a second hole, and wherein the first hole and the gate line are horizontal and the second hole and the gate line are horizontal when the drain electrode and the gate line are horizontal.

24. The display device of claim 13, wherein the shapes of the first and the second electrodes are substantially the same.

* * * * *